(12) United States Patent
Tanizaki et al.

(10) Patent No.: US 12,510,830 B2
(45) Date of Patent: Dec. 30, 2025

(54) MEASURING DEVICE AND MEASURING METHOD

(71) Applicant: Kioxia Corporation, Tokyo (JP)

(72) Inventors: Hiroyuki Tanizaki, Nagoya Aichi (JP); Kiminori Yoshino, Kuwana Mie (JP); Kaori Fumita, Yokkaichi Mie (JP); Hiroaki Shirakawa, Yokkaichi Mie (JP); Manabu Takakuwa, Tsu Mie (JP); Kentaro Kasa, Nagoya Aichi (JP); Soichi Inoue, Yokkaichi Mie (JP); Satoshi Tanaka, Yokohama Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 77 days.

(21) Appl. No.: 18/405,339

(22) Filed: Jan. 5, 2024

(65) Prior Publication Data

US 2024/0231244 A1    Jul. 11, 2024

(30) Foreign Application Priority Data

Jan. 10, 2023    (JP) .................................. 2023-001965

(51) Int. Cl.
*G03F 7/00* (2006.01)
*G01N 21/95* (2006.01)
*G01N 21/956* (2006.01)

(52) U.S. Cl.
CPC ..... *G03F 7/70633* (2013.01); *G01N 21/9501* (2013.01); *G01N 21/956* (2013.01);
(Continued)

(58) Field of Classification Search
CPC ....... G01B 11/14; G01B 11/26; G01B 11/272; G01B 11/27; G01N 21/9501;
(Continued)

(56) References Cited

U.S. PATENT DOCUMENTS 8,593,646 B2 *  11/2013  Den Boef .............. G01B 11/14
                                                356/399
8,730,465 B2 *   5/2014  Endo ................... G03F 7/70625
                                                356/426
(Continued)

FOREIGN PATENT DOCUMENTS

JP        4578495 B2   11/2010
JP        6045588 B2   12/2016
(Continued)

*Primary Examiner* — Gordon J Stock, Jr.
(74) *Attorney, Agent, or Firm* — Foley & Lardner LLP

(57) ABSTRACT

A measuring device includes a light source that irradiates a measurement spot on a wafer formed with memory holes and slits with a multi-wavelength light, a first imaging unit that acquires a first pupil plane intensity distribution image of reflected light from the measurement spot, a second imaging unit that acquires a second pupil plane intensity distribution image of the reflected light, and a detection unit that analyzes the second pupil plane intensity distribution image to measure overlay. The measuring device includes an overlay analysis unit that acquires the first and second pupil plane intensity distribution images while moving a position of the measurement spot and selects a measurement spot not including the slit based on the first pupil plane intensity distribution image, and uses the overlay obtained by analyzing the second pupil plane intensity distribution image of the selected measurement spot as the overlay of the memory hole and a slit.

11 Claims, 12 Drawing Sheets

(52) U.S. Cl.
CPC .. *G03F 7/706833* (2023.05); *G03F 7/706849* (2023.05); *G03F 7/706851* (2023.05)

(58) Field of Classification Search
CPC ............ G01N 21/956; G03F 7/706843; G03F 7/706849; G03F 7/706851; G03F 7/70683; G03F 7/70681; G03F 7/706831; G03F 7/706833; G03F 7/70633; G03F 7/70616
See application file for complete search history.

(56) References Cited

U.S. PATENT DOCUMENTS

| | | | | |
|---|---|---|---|---|
| 9,189,705 | B2* | 11/2015 | Jeong | G06T 7/001 |
| 9,739,719 | B2* | 8/2017 | Fu | G01N 21/9501 |
| 9,778,025 | B2* | 10/2017 | Mathijssen | G01B 11/14 |
| 9,921,104 | B2* | 3/2018 | Krishnan | G03F 7/70625 |
| 10,018,560 | B2* | 7/2018 | Hill | G01N 21/9501 |
| 10,288,408 | B2* | 5/2019 | Smith | G01N 21/956 |
| 10,380,728 | B2* | 8/2019 | Pandev | G06T 7/0004 |
| 10,444,640 | B2* | 10/2019 | Ravensbergen | G01B 9/0209 |
| 10,534,274 | B2* | 1/2020 | Tukker | G01B 9/02016 |
| 10,546,790 | B2 | 1/2020 | Van Leest et al. | |
| 10,895,812 | B2* | 1/2021 | Pandey | G03F 7/70625 |
| 11,175,593 | B2* | 11/2021 | Huisman | G03F 7/70641 |
| 11,531,275 | B1* | 12/2022 | Hill | G03F 7/70633 |
| 11,579,535 | B2* | 2/2023 | Anunciado | G03F 7/70625 |
| 11,698,346 | B2* | 7/2023 | Barbu | G01N 21/95607 382/145 |
| 2007/0229837 | A1 | 10/2007 | Van Der Schaar et al. | |
| 2013/0050501 | A1 | 2/2013 | Warnaar et al. | |
| 2017/0059999 | A1 | 3/2017 | Van Der Schaar et al. | |
| 2017/0255112 | A1 | 9/2017 | Van Leest et al. | |
| 2023/0314319 | A1* | 10/2023 | Manassen | G01N 21/956 356/401 |
| 2023/0328351 | A1* | 10/2023 | Vaknin | H04N 23/56 |
| 2024/0036484 | A1* | 2/2024 | Davis | G03F 9/7046 |
| 2024/0345489 | A1* | 10/2024 | Tenner | G03F 7/7065 |
| 2024/0361705 | A1* | 10/2024 | Tarabrin | G03H 1/0866 |
| 2024/0402615 | A1* | 12/2024 | Weiss | G03F 7/70633 |
| 2025/0036031 | A1* | 1/2025 | Sonde | G01B 11/27 |
| 2025/0147438 | A1* | 5/2025 | Shome | G03F 7/70308 |
| 2025/0208522 | A1* | 6/2025 | Warnaar | G03F 9/7065 |

FOREIGN PATENT DOCUMENTS

| | | |
|---|---|---|
| JP | 6707657 B2 | 6/2020 |
| JP | 6740338 B2 | 8/2020 |
| JP | 6765435 B2 | 10/2020 |
| JP | 6782784 B2 | 11/2020 |
| JP | 6824999 B2 | 2/2021 |

* cited by examiner

SLIT SPACE STS: 13
SLIT WIDTH STW: 2
SPOT SIZE SY: 10
MEASUREMENT
NUMBER N: 5

MEASURING DEVICE AND MEASURING METHOD

CROSS-REFERENCE TO RELATED APPLICATION

This application is based upon and claims the benefit of priority from Japanese Patent Application No. 2023-001965, filed Jan. 10, 2023, the entire contents of which are incorporated herein by reference.

FIELD

Embodiments described herein relate generally to a measuring device and a measuring method.

BACKGROUND

Semiconductor memory devices are becoming highly stacked and are also decreasing in size. For this reason, along with the lithography technique that forms fine patterns on stacked layers, controlling pattern misalignment (overlay) are considered to be the important technologies for improving the reliability and yield of semiconductor memory devices. A measuring device that uses a pupil plane intensity distribution image is known as a device that measures overlay with high accuracy.

DETAILED DESCRIPTION

At least one embodiment provides a measuring device and a measuring method capable of measuring overlays robustly and accurately.

Solution to Problem

In general, according to at least one embodiment, a level difference measuring device of the embodiment includes a specimen stage on which a specimen including, formed on a surface thereof, a first pattern, a second pattern, and a third pattern is placed, a light source that irradiates a measurement spot set on the specimen with a multi-wavelength light, a beam splitter that splits reflected light emitted from the measurement spot by the irradiation with the multi-wavelength light into two directions, a first imaging unit (first imager) that acquires a first pupil plane intensity distribution image of one of the reflected lights split by the beam splitter, a second imaging unit (second imager) that acquires a second pupil plane intensity distribution image of the other reflected light split by the beam splitter, and an analysis unit (analyzer) that analyzes the second pupil plane intensity distribution image to measure an overlay of the first pattern and the second pattern formed at the measurement spot. Further, the measuring device may include an overlay measurement unit (one or more processors) that acquires the first pupil plane intensity distribution image and the second pupil plane intensity distribution image at each of a plurality of the measurement spots while moving a position of the measurement spot on the specimen, selects the measurement spot not including the third patterns based on the first pupil plane intensity distribution image, and uses the overlay obtained by analyzing the second pupil plane intensity distribution image of the selected measurement spot as the overlay of the first pattern and the second pattern.

Embodiments will be described with reference to the drawings.

1. Configuration

1-1. Configuration of Specimen

For example, in a memory cell array formed in a non-volatile memory as a semiconductor memory device, a measuring device of the embodiment can be used to measure overlay between an insulating layer (slit) separating string units and a memory hole. First, the configuration of a specimen will be described with reference to FIGS. 1 to 6.

Figure 1:
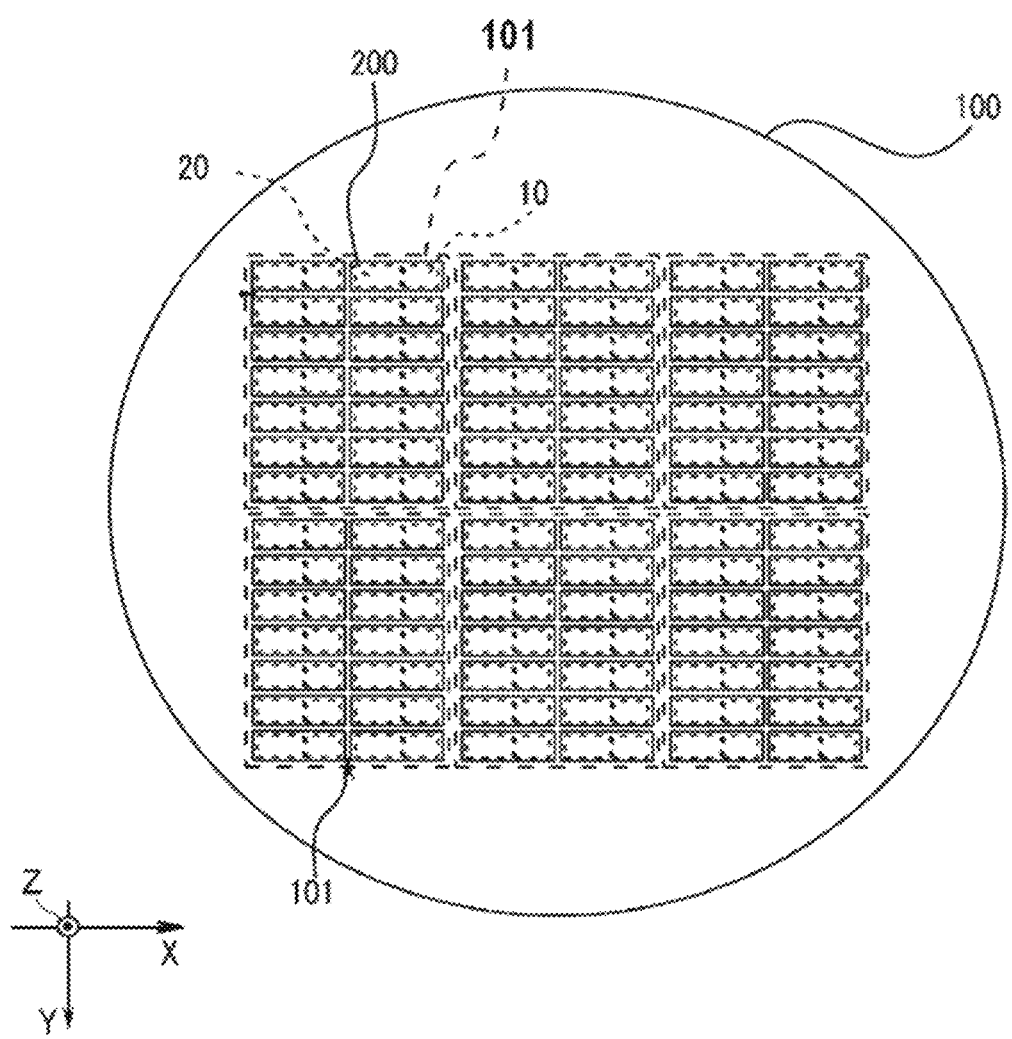
FIG. 1 is a plan view illustrating an example of a layout of memory chips disposed on a wafer according to at least one embodiment.

FIG. 1 is a plan view illustrating an example of a layout of memory chips arranged on a wafer according to the present embodiment. A non-volatile memory, which is a specimen, includes memory cell arrays 10 and peripheral circuits 20. The non-volatile memory is formed in a wafer 100 as a memory chip 200. In the following description, one direction parallel to a plane parallel to the surface of the wafer 100 is defined as the X direction. Further, the direction parallel to the surface of the wafer 100 and orthogonal to the X direction is defined as the Y direction. Further, the direction perpendicular to the surface of the wafer 100 is defined as the Z direction. As illustrated in FIG. 1, a plurality of memory chips 200 are arranged in rows and columns in the X direction and the Y direction on the wafer 100. The non-volatile memories are formed in each of the plurality of memory chips 200 on the wafer 100 as various processes such as deposition of various films using CVD technology, and the like, injection of impurities into various films using ion implantation technology, patterning of the deposited film using lithography and etching techniques are repeated.

Lithography is a technique of forming a fine resist pattern on the outermost surface of a wafer mainly through three processes of: coating, which is the process of applying photoresist (photosensitive); exposure, which passes UV light through a patterned reticle to transfer the pattern to the resist film; and development, which removes exposed or unexposed areas with a developer to form a resist pattern. Generally, patterns of the plurality of memory chips 200 are formed on a reticle 101. In the exposure process, exposure is performed multiple times while moving the exposure location by moving the reticle 101 or the wafer 100 such that a resist pattern is formed on all memory chips 200. FIG. 1 illustrates an example in which a pattern of 10 memory chips 200 is formed on one reticle 101, and the wafer 100 is exposed six times. It is to be noted that the number of chip patterns in one reticle is not limited to 10, and may include more patterns, for example. Further, the number of exposures performed on one wafer is not limited to six times, and for example, more exposures may be performed.

Figure 2:
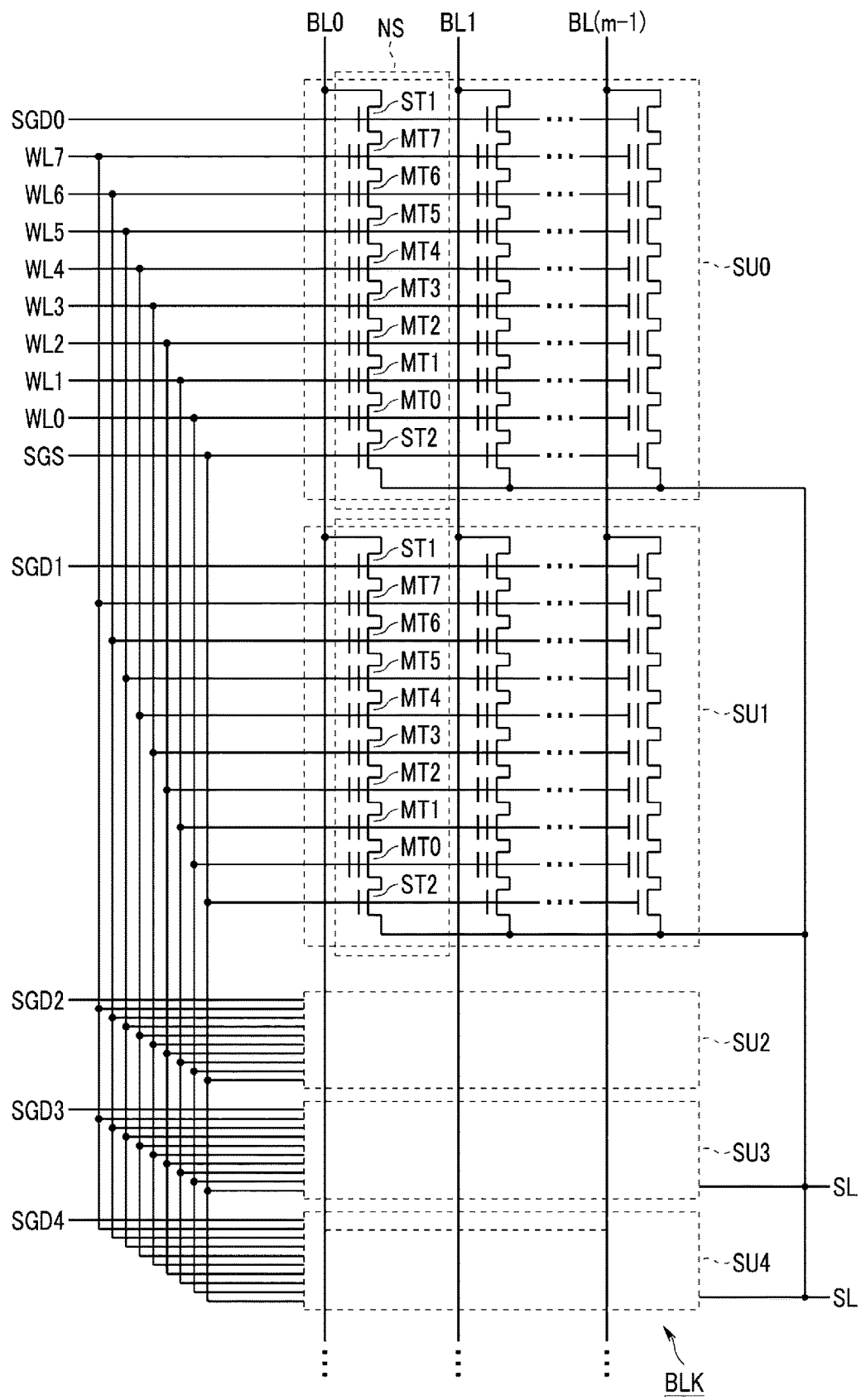
FIG. 2 is a view illustrating an example of a block configuration of a NAND memory cell array with a three-dimensional structure.

The memory cell array 10 includes a plurality of blocks. FIG. 2 is a view illustrating an example of a block configuration of a NAND memory cell array with a three-dimensional structure. FIG. 2 illustrates one block BLK of a plurality of blocks configuring the memory cell array 10. Other blocks of the memory cell array also have the same configuration as in FIG. 2.

As illustrated, the block BLK includes five string units (SU0 to SU4), for example. Further, each string unit SU includes a plurality of NAND strings NS. Each of the NAND strings NS includes eight memory cell transistors MT (MT0 to MT7) and select gate transistors ST1 and ST2. Although the number of memory cell transistors MT in the NAND string NS is eight in this example, it is to be noted that the number of memory cell transistors MT are not limited to eight, and there may be 32, 48, 64, 96, and the like, for example. Although the select gate transistors ST1 and ST2 are illustrated as one transistor on an electric circuit, by structure, the number of select gate transistors may be the same as that of the memory cell transistors. Further, for example, in order to improve cutoff characteristics, a plurality of select gate transistors may be used as each of the select gate transistors ST1 and ST2. Further, dummy cell transistors may be provided between the memory cell transistor MT and the select gate transistors ST1 and ST2.

The memory cell transistors MT are arranged to be connected in series between the select gate transistors ST1 and ST2. A memory cell transistor MT7 on one end side is connected to the select gate transistor ST1, and a memory cell transistor MT0 on the other end side is connected to the select gate transistor ST2.

The gates of the select gate transistors ST1 of each of string units SU0 to SU4 are connected to select gate lines SGD0 to SGD4 (hereinafter referred to as select gate lines SGD unless it is necessary to distinguish them), respectively. On the other hand, the gates of the select gate transistors ST2 are commonly connected to the same select gate line SGS of a plurality of string units SU in the same block BLK. Further, the gates of memory cell transistors MT0 to MT7 in the same block BLK are commonly connected to word lines WL0 to WL7, respectively. That is, the word lines WL0 to WL7 and the select gate line SGS are commonly connected to a plurality of string units SU0 to SU4 in the same block BLK, whereas the select gate lines SGD are individually connected to the string units SU0 to SU4 even in the same block (BLK), respectively.

The word lines WL0 to WL7 are connected to the gates of memory cell transistors MT0 to MT7 forming the NAND string NS, respectively. The gates of memory cell transistors MTi in the same row in the block BLK are connected to the same word line WLi.

Each NAND string NS is connected to a corresponding bit line BL0, BL1, . . . BL(m-1) and is connected to a source line SL. Therefore, each memory cell transistor MT is connected to the bit line via the select gate transistors ST1 and ST2 and other memory cell transistors MT of the NAND string NS.

Figure 3:
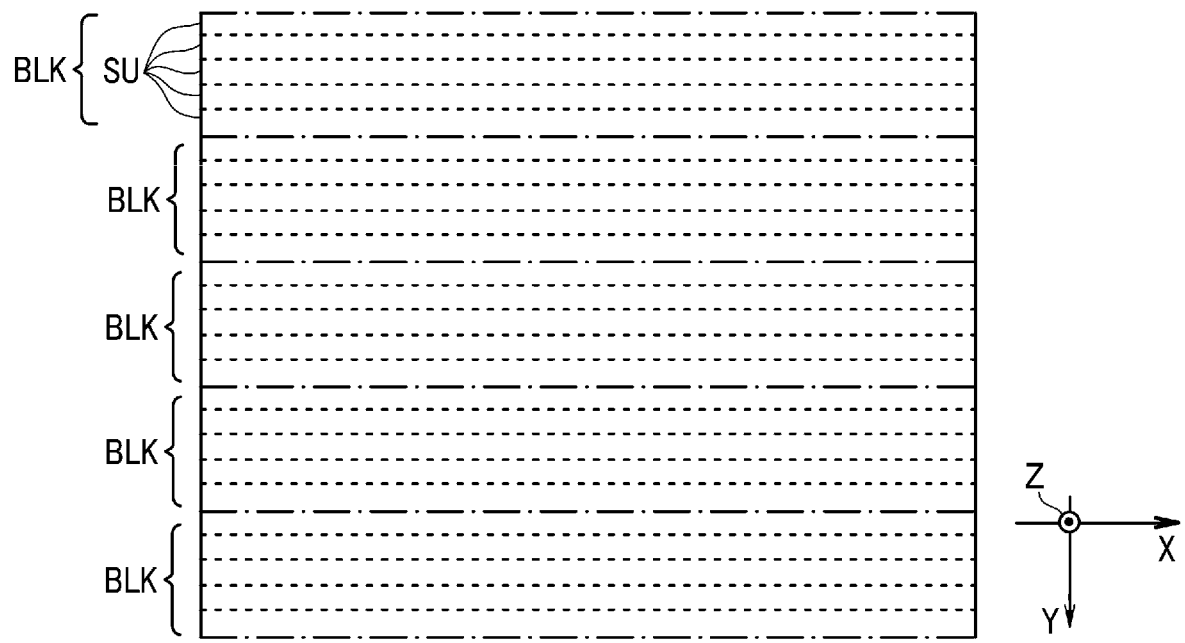
FIG. 3 is a plan view illustrating an example of a memory cell array formed in the memory chip of FIG. 1.

FIG. 3 is a plan view illustrating an example of the memory cell array formed in the memory chip of FIG. 1. FIG. 3 is an enlarged view of a partial area of the memory cell array 10. Each block BLK of the memory cell array 10 is formed as a strip-shaped region having a longitudinal direction in the X direction and a predetermined width in the Y direction. A slit ST (portion indicated by a dashed line in FIG. 3) is formed between each block BLK. The slit ST is filled with an insulating material and electrically isolates adjacent blocks BLK. Each block BLK includes the plurality of string units SU. The string unit SU is formed as a strip-shaped region that is formed by dividing the block BLK in the Y direction. A slit SHE (portion indicated by a dotted line in FIG. 3) is formed between each string unit SU. The slit SHE is filled with an insulating material and electrically isolates the select gate lines SGD between adjacent string units SU. Each string unit SU includes a plurality of NAND strings. Each NAND string NS is formed in a cylindrical memory hole MH extending in the Z direction.

Figure 4:
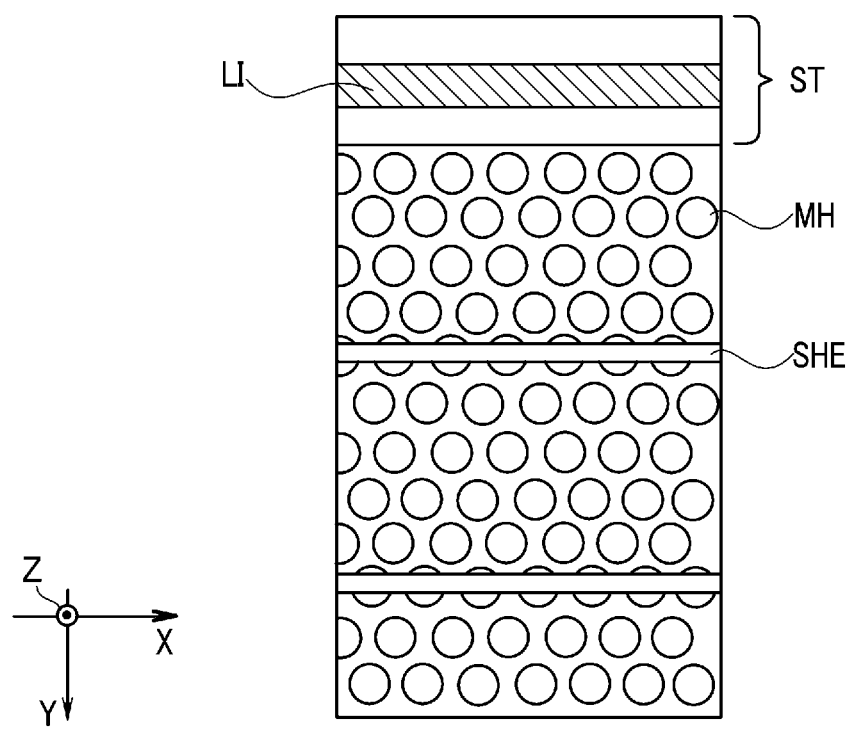
FIG. 4 is an enlarged view of a partial area of the memory cell array in FIG. 3.

FIG. 4 is an enlarged view of the partial area of the memory cell array in FIG. 3. FIG. 4 is an enlarged view of a partial area of one block BLK. Each block BLK is separated from the adjacent block by the slit ST. A wiring LI serving as a connection wiring to a source line may be formed in the slit ST. The circles in FIG. 4 indicate memory holes MH forming the NAND string. A plurality of memory holes MH forming the NAND string NS are arranged in one string unit SU. There are a large number of NAND strings (memory holes) in one string unit (although only 28 strings are illustrated in FIG. 4), and in order to reduce the chip size, the memory holes MH are arranged in a staggered arrangement. It is not necessary to form the memory hole MH in the formation region of the slit SHE that partitions each string unit SU. However, for the manufacturing reasons, the memory holes MH may be formed in uniform positions. In this case, as illustrated in FIG. 4, the slits SHE partially overlap with the memory holes MH.

Figure 5:
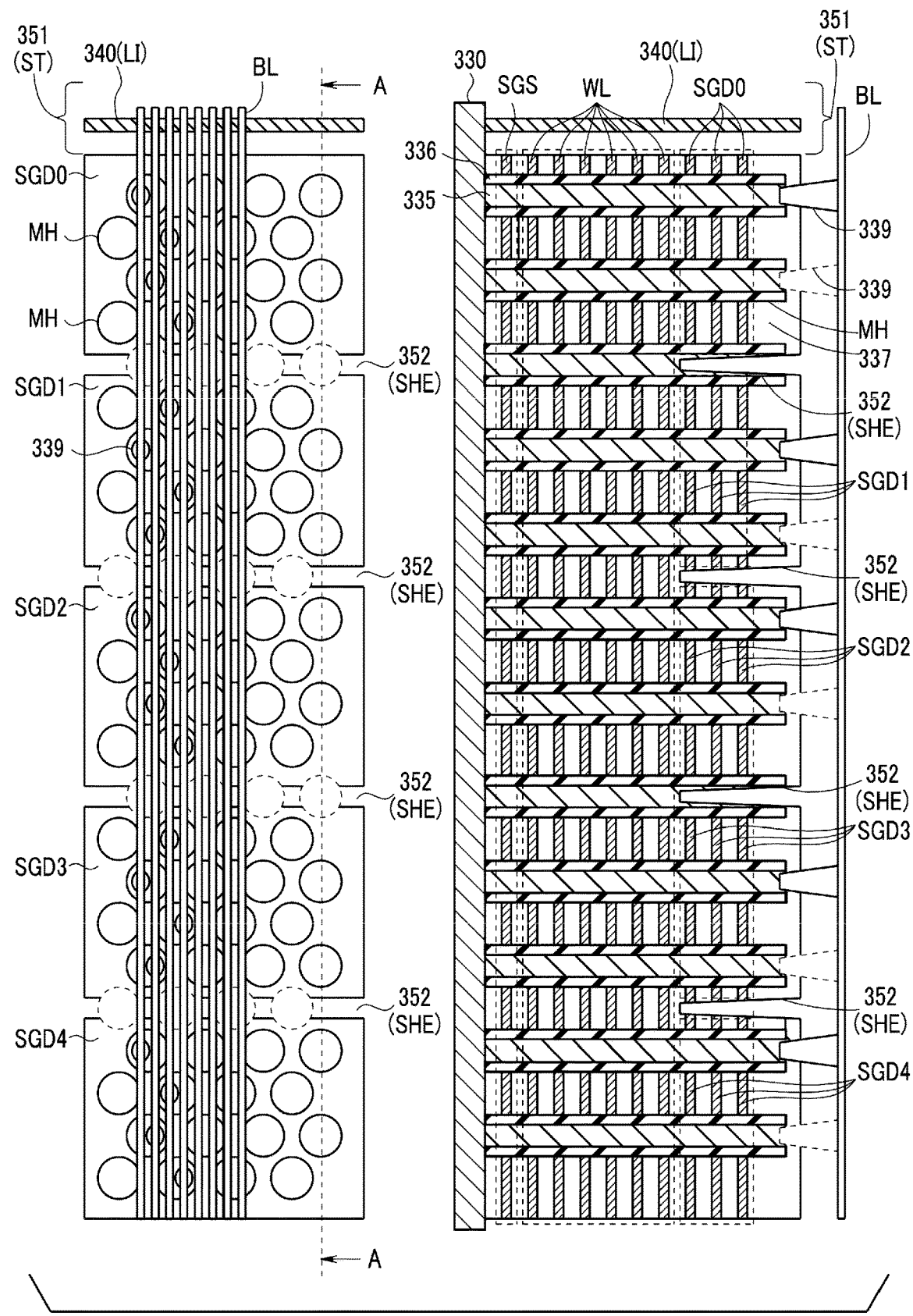
FIG. 5 is a plan view and a cross-sectional view illustrating an example of a detailed structure of the memory cell array.

FIG. 5 is a plan view and a cross-sectional view illustrating an example of a detailed structure of the memory cell array. In FIG. 5, the planar shape of a part of the block BLK is illustrated on the left-hand side of the drawing, and the cross-sectional shape taken along the line A-A is illustrated on the right-hand side of the drawing. An insulating layer 351 separates one block BLK illustrated in FIG. 5 from the other blocks BLK. Specifically, as illustrated in the cross-sectional view on the right-hand side of FIG. 5, the insulating layer 351 extends from an upper surface of an interlayer insulating film 337 formed on the select gate line SGD to a source line 330, isolating the select gate line SGD, a plurality of word lines WL, and the select gate line SGS between the blocks BLK. The insulating layer 351 serves as a slit ST filled with an insulating material. A wiring 340 extending from the upper surface of the interlayer insulating film 337 to the source line 330 is formed in the insulating layer 351. The wiring 340 serves as a wiring LI that is a connection wiring to the source line 330. The example in FIG. 5 illustrates that five string units SU0 to SU4 each including five select gate lines SGD0 to SGD4 separated by an insulating layer 352 are formed in one block BLK. In the example on the right-hand side of FIG. 5, the insulating layer 352 extends from the upper surface of the interlayer insulating film 337 formed on the select gate line SGD to between a lowermost layer of the plurality of select gate lines SGD and an uppermost layer of the plurality of word lines WL, separating each select gate line SGD0 to SGD4 from each other. That is, the insulating layer 352 is a slit SHE filled with an insulating material. It is to be noted that although FIG. 5 illustrates, as an example, that the interlayer insulating film 337 is formed such that the upper surface of the interlayer insulating film 337 is located higher than the upper surface of the memory hole MH, the interlayer insulating film 337 may be formed such that the upper surface of the memory hole MH and the upper surface of the interlayer insulating film 337 are at the same height.

Each memory hole MH in one string unit is connected to bit lines BL0, BL1, . . . (hereinafter, unless it is necessary to distinguish them, the bit lines will be referred to as the bit lines BL) by contact plugs 339, respectively. It is to be noted that, on the left-hand side of FIG. 5, only some bit lines BL and some contact plugs 339 are illustrated in consideration of the ease of viewing.

As illustrated in FIG. 5, each bit line BL0, BL1, . . . is connected to one memory hole MH for each string via the contact plug 339, respectively. It is to be noted that the position of the contact plug 339 is shifted in a direction perpendicular to the extending direction of the bit line BL in order to connect each bit line BL to one memory hole MH of each string.

A plurality of NAND strings NS are formed on the source line 330. That is, on the source line 330, a select gate line SGS, a plurality of word lines WL, and a plurality of select gate lines SGD are stacked with an insulating film interposed therebetween. Then, a memory hole MH is formed that passes through these select gate lines SGD, word lines WL, and select gate lines SGS and reaches the source line 330. An ONO film 336 including a block insulating film, a charge storage film (charge holding region), and a gate insulating film is formed on the side surface of the memory hole MH, and a conductor column 335 is further embedded in the memory hole MH. The conductor column 335 is made of polysilicon, for example, and serves as an area where channels are formed during the operation of the memory cell transistors MT and the select gate transistors ST1 and ST2 in the NAND string NS. That is, the select gate line SGD, the conductor column 335, and the ONO film 336 each serve as the select gate transistor ST1, the word line WL, the conductor column 335, and the ONO film 336 each serve as a memory cell transistor MT, and the select gate line SGS, the conductor column 335, and the ONO film 336 serve as the select gate transistor ST2.

It is to be noted that although FIG. 5 illustrates that the memory hole MH has a cylindrical shape with the same diameter, in reality, the memory hole MH has a tapered shape with a narrower diameter toward the source line 330. Furthermore, depending on the manufacturing process, the memory hole MH and the conductor column may have a tapered shape with multiple stages, which expands in diameter midway through the tapered shape and then narrows in diameter again toward the source line 330.

Figure 6:
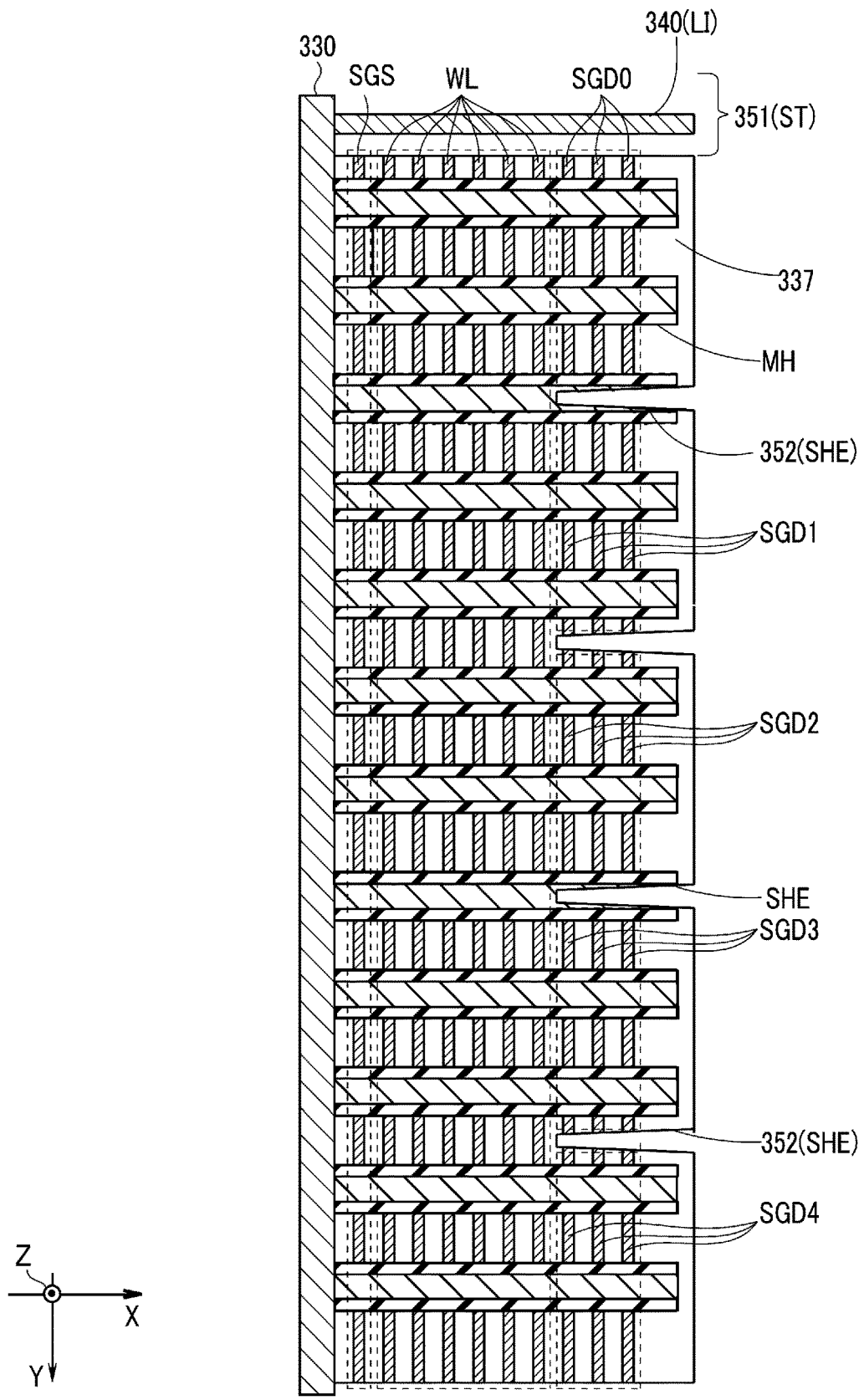
FIG. 6 is a cross-sectional view illustrating an example of the structure of a specimen serving as a measurement target.

FIG. 6 is a cross-sectional view illustrating an example of a structure of the specimen serving as a measurement target. In the measuring device of at least one embodiment, the wafer 100 at a stage (in a state before filling with insulating material) in which slits ST and SHE are formed in the interlayer insulating film 337 in the memory cell array 10 having the structure illustrated in FIG. 5, for example, is used as the specimen. That is, in the specimen having the structure illustrated in FIG. 6, the overlay between the slit SHE separating the string units SU and the memory hole MH is measured.

1-2. Configuration of Measuring Device By

Figure 7:
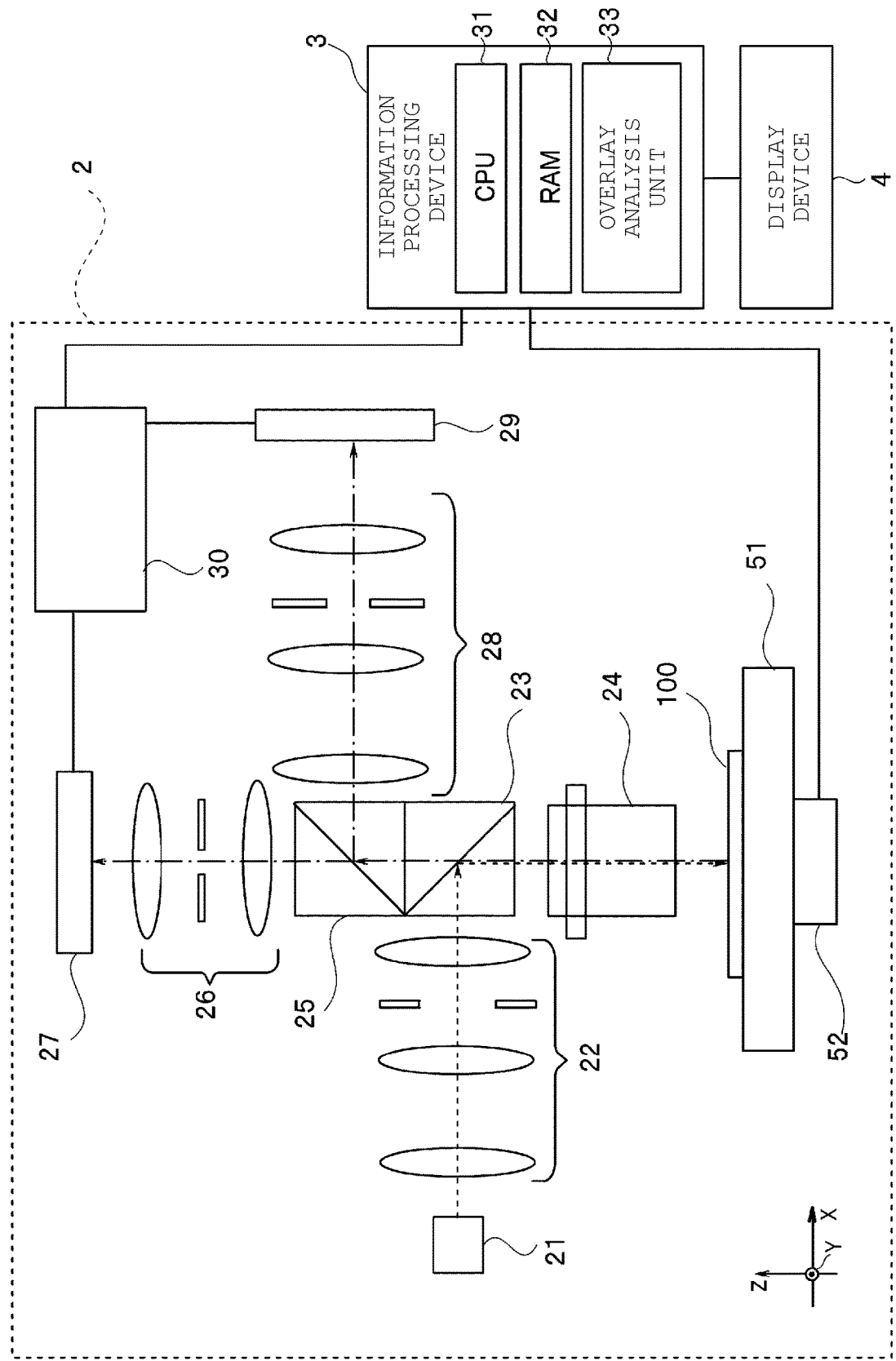
FIG. 7 is a block diagram illustrating a configuration example of a measuring device according to at least one embodiment.

FIG. 7 is a block diagram illustrating a configuration example of the measuring device according to an embodiment. The measuring device of the embodiment includes a pupil plane intensity distribution image measuring device 2 and an information processing device 3. It is to be noted that the measuring device may further include a display device 4 that displays information regarding the measured overlay, data acquired during measurement, and the like.

The pupil plane intensity distribution image measuring device 2 irradiates the specimen (in this example, the wafer 100) with illumination light and transmits reflected light (diffraction light) to two detection units at the same time. By configuring the transmission paths of the reflected light to the respective detection units differently, two types of pupil plane intensity distribution images can be acquired. The first one is a pupil plane intensity distribution image in which the intensity distribution changes according to the three-dimensional shape (uneven shape) of the pattern formed on the surface of the wafer 100. The second is a pupil plane intensity distribution image in which the intensity distribution changes according to the planar shape of the pattern formed on the surface of the wafer 100 (the shape of the pattern in the XY plane). Hereinafter, the pupil plane intensity distribution image reflecting the three-dimensional shape will be referred to as a first intensity distribution image, and the pupil plane intensity distribution image reflecting the planar shape will be referred to as a second intensity distribution image.

The pupil plane intensity distribution image measuring device 2 includes a light source 21, an illumination optical system 22, a prism 23, and an objective optical system 24 as a mechanism for transmitting illumination light to the wafer 100. Furthermore, the pupil plane intensity distribution image measuring device 2 includes a beam splitter 25, a first detection optical system 26, a first imaging unit 27, a second detection optical system 28, a second imaging unit 29, and a detection unit 30 as a mechanism for transmitting reflected light (diffraction light) from the wafer 100 and detecting a pupil plane intensity distribution image. Further, the pupil plane intensity distribution image measuring device 2 includes a specimen stage 51 and a stage drive unit 52 as a mechanism for placing the wafer 100 and adjusting the measurement position.

The illumination light (multi-wavelength light) emitted from the light source 21 passes through the illumination optical system 22 and is reflected by the prism 23, and then is guided to the wafer 100 placed on the specimen stage 51 via the objective optical system 24. The illumination optical system 22 includes a diaphragm and has a structure capable of changing the shape of an opening provided in the diaphragm. Therefore, by changing the size and shape of the opening, it is possible to change the size and shape of the range of illumination (hereinafter referred to as a measurement spot) irradiated onto the surface of the wafer 100. In addition, in FIG. 7, the optical axis of illumination light is schematically illustrated by a dotted line, and the optical axis of reflected light is schematically illustrated by a dashed line. It is to be noted that by using a specific wavelength as the illumination light, it is also possible to measure various structures according to the characteristics of the material of the film formed on the wafer 100, but measurements other than overlay are not particularly described in this specification.

The illumination light irradiated onto the measurement spot on the wafer 100 is reflected by the wafer 100, passes through the prism 23 via the objective optical system 24 again, and enters the beam splitter 25. The light split upward in the Z direction by the beam splitter 25 forms a pupil plane intensity distribution image (the first intensity distribution image) of the measurement spot on the first imaging unit 27 via the first detection optical system 26. Meanwhile, the light split in the X direction by the beam splitter 25 forms a pupil plane intensity distribution image (the second intensity distribution image) of the measurement spot on the second imaging unit 29 via the second detection optical system 28.

For example, when the illumination optical system 22 is provided with a polarizer, and the first detection optical system 26 and the second detection optical system 28 are each provided with an analyzer, the direction of the transmission axis of the polarizer and the direction of the transmission axis of the analyzer of the first detection optical system 26 are set so as to satisfy a parallel Nicol condition, and the direction of the transmission axis of the polarizer and the direction of the transmission axis of the analyzer of the second detection optical system 28 are set so as to satisfy a crossed Nicol condition in which the directions are orthogonal to each other.

The first intensity distribution image formed on the first imaging unit 27 and the second intensity distribution image formed on the second imaging unit 29 are output to the detection unit 30. The detection unit 30 estimates the three-dimensional shape (uneven shape) of the pattern formed in the measurement spot based on the luminance distribution of each pixel in the first intensity distribution image. Furthermore, the detection unit 30 extracts an asymmetry signal from the second intensity distribution image, and uses the signal to estimate the overlay of the pattern formed on the measurement spot. That is, the overlay of the pattern can be measured using the second intensity distribution image. In addition, the detection unit 30 is configured to be able to output data such as the first intensity distribution image, the second intensity distribution image, and the shape of the pattern estimated from these to the information processing device 3.

The specimen stage 51 is configured to be movable in the X direction and the Y direction by the stage drive unit 52. Further, the specimen stage 51 is configured to be rotatable around an axis parallel to the Z axis in the XY plane. By moving the specimen stage 51 with the wafer 100 placed thereon, the position of the measurement spot on the wafer 100 can be moved.

The information processing device 3 is a computer, for example, and includes a central processing unit (CPU) 31, a RAM 32, and an overlay analysis unit 33. The information processing device 3 calculates the overlay between the specified patterns in the evaluation target set on the wafer 100 based on the data input from the pupil plane intensity distribution image measuring device 2. For example, when a specific block BLK of the memory cell array 10 in a specific memory chip 200 on the wafer 100 is set as an evaluation target, the information processing device 3 calculates the overlay between the memory hole MH and the slit SHE formed in the block BLK.

The CPU 31 operates according to a program stored in a memory (not illustrated) and controls each part of the information processing device 3. The RAM 32 stores data input from the pupil plane intensity distribution image measuring device 2 and stores the detection results from the overlay analysis unit 33.

The overlay analysis unit 33 calculates the overlay between specified patterns within the evaluation target based on the data input from the pupil plane intensity distribution image measuring device 2. In addition, the overlay calculation may be performed using software by storing the operation in the overlay analysis unit 33 in advance as a program in a memory (not illustrated) and executing the same in the CPU 31. Further, the information processing device 3 is integrally configured as a part of the pupil plane intensity distribution image measuring device 2, and may have a function of controlling the pupil plane intensity distribution image measuring device 2, such as controlling the position adjustment of the specimen stage 51, in addition to calculating the overlay between specified patterns.

2. Method

Next, a measuring method in the embodiment will be described. First, an overview of the measuring method will be described. In the overlay measurement, it is desirable to position the measurement spot such that only the pattern serving as the measurement target is present at the measurement spot. This is because when there is a pattern other than the measurement target in the measurement spot, the pupil plane intensity distribution image is affected by the pattern, and so the overlay may not be measured accurately. More specifically, for example, when the overlay between the memory hole MH and the slit SHE is the measurement target, when the slit ST is present at the measurement spot, the overlay may not be accurately measured. Therefore, it is necessary to acquire a pupil plane intensity distribution image in a state in which the measurement spot does not include any pattern (e.g., slit ST) other than the measurement target. Therefore, the pupil plane intensity distribution image is acquired while moving the position of the measurement spot, and a measurement spot position suitable for accurate overlay measurement is specified. Then, the planar shape of the pattern formed on the measurement spot at the specified position is estimated, and the overlay between the target patterns is calculated.

Figure 8:
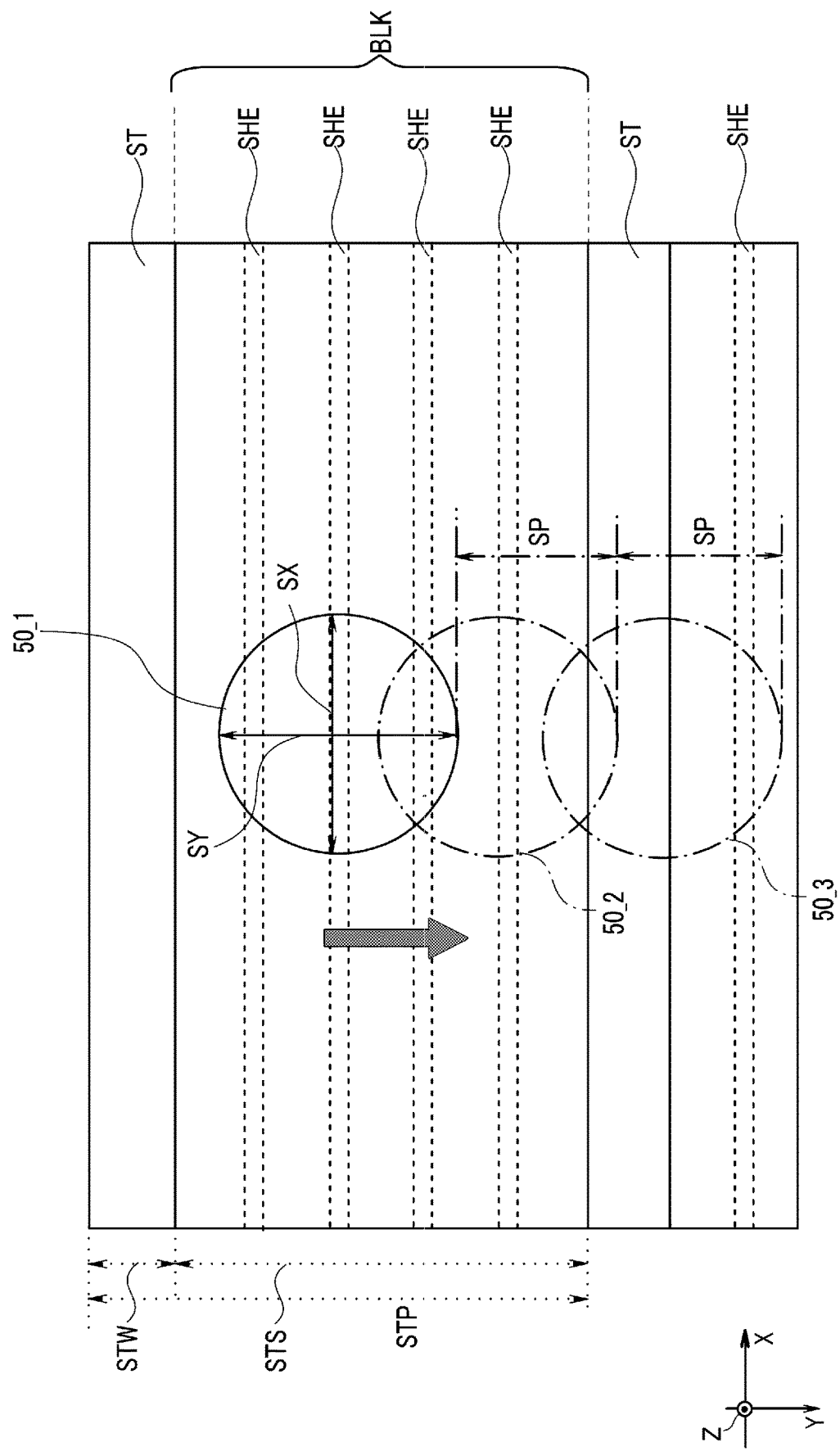
FIG. 8 is a plan view illustrating an example of various dimensions used for setting measurement spots.

FIG. 8 is a plan view illustrating an example of various dimensions used for setting the measurement spots. An example will be described herein, in which the overlay between the memory hole MH and the slit SHE formed in the specific block BLK is measured using the example described above. A measurement spot 50 is set by the shape of the spot, a length SX in the X direction, and a length SY in the Y direction. FIG. 8 illustrates an example in which the measurement spot 50 has a circular shape. In this case, the length SX in the X direction and the length SY in the Y direction match the diameter of the measurement spot 50. It is to be noted that the shape of the measurement spot 50 is not limited to the circular shape.

The minimum and maximum values of the spot size (length SX in the X direction and length SY in the Y direction) of the measurement spot 50 are determined by the configuration and arrangement of the light source 21, the illumination optical system 22, the prism 23, and the objective optical system 24, for example.

Figure 9A:
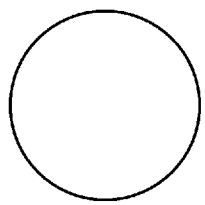
FIGS. 9A-9C are a schematic diagram illustrating an example of a shape of the measurement spot.
Figure 9B:
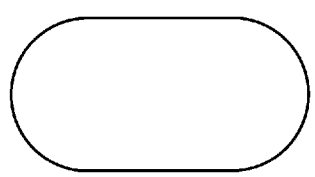
Figure 9C:
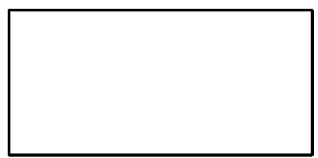

FIGS. 9A to 9C are schematic diagrams illustrating examples of a shape of the measurement spot. The shape of the measurement spot 50 may be circular as illustrated in FIG. 9A, elliptical as illustrated in FIG. 9B, or rectangular as illustrated in FIG. 9C. When an elliptical shape or a rectangular shape, the shape may be long in the X direction or the shape may be long in the Y direction. Any shape may be selected as long as it has a size and shape that includes a pattern serving as the measurement target and does not include patterns other than the measurement target.

The block BLK that is the evaluation target is a strip-shaped area having a longitudinal direction in the X direction. The slits ST are arranged above and below the block BLK in the Y direction, in contact with the longitudinal sides of the block BLK. At this time, the length (width) of the block BLK in the Y direction is defined as a slit space STS, and the length (width) of the slit ST in the Y direction is defined as a slit width STW. Further, the distance (width) in the Y direction between corresponding portions (e.g., respective ends) of two adjacent slits ST is defined as a slit pitch STP. The slit width STW is sufficiently smaller than the slit pitch STP.

Since the slits ST are arranged above and below the block BLK in the Y direction, even if the position of the measurement spot 50 is shifted in the X direction, the slit ST will not be in the measurement spot 50. Meanwhile, in the Y direction, when the set position of the measurement spot 50 is shifted in the Y direction, the measurement spot 50 may include the slit ST. Therefore, it is necessary to acquire multiple pupil plane intensity distribution images while moving the measurement spot 50 in the Y direction (in the direction indicated by the thick black arrow in FIG. 8), and to specify the measurement spot position suitable for accurate overlay measurement. The acquired interval of the measurement spots 50 at this time (the distance in the Y direction between two measurement spots 50 that are set consecutively) is defined as a spot pitch SP.

Figure 10:
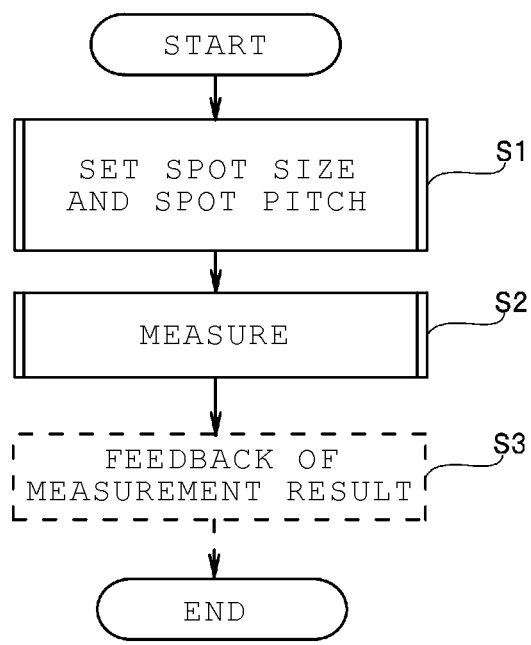
FIG. 10 is a flowchart illustrating an example of a measuring method according to at least one embodiment.

FIG. 10 is a flowchart illustrating an example of the measuring method according to at least one embodiment. By executing the procedure illustrated in FIG. 10, it is possible to measure the overlay robustly and accurately even when there is, close to the measurement target pattern, a pattern other than the measurement target.

Figure 11:
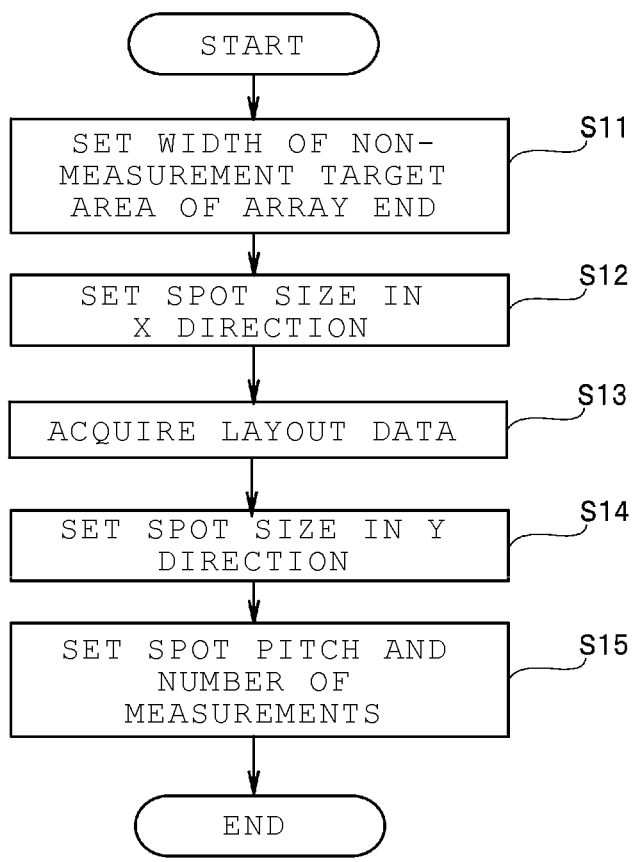
FIG. 11 is a flowchart illustrating an example of a detailed procedure of S1 illustrated in FIG. 10.

First, the spot size (lengths in the X and Y directions) of the measurement spot 50 and the spot pitch SP are set (S1). S1 is performed according to the procedure illustrated in FIG. 11, for example. FIG. 11 is a flowchart illustrating an example of a detailed procedure of S1 illustrated in FIG. 10. First, an area other than the measurement target is set at the end of the memory cell array 10 in the X direction that includes the block BLK that is the evaluation target (S11). Next, the length SX of the measurement spot 50 in the X direction is determined (S12). As will be described below, as the length SX of the measurement spot 50 in the X direction is longer, the amount of signals that can be acquired per unit time can be increased. For this reason, for example, the length SX of the measurement spot 50 in the X direction is set such that the measurement spot 50 does not overlap with the area other than the measurement target set at S11 in the X direction. Then, Computer Aided Design (CAD) data, which is layout data of each part forming the semiconductor memory device, is acquired (S13). At S13, at least two types of data of the slit pitch STP, slit space STS and slit width STW are acquired.

Next, the length SY of the measurement spot 50 in the Y direction is set (S14). If the length SY of the measurement spot 50 in the Y direction is longer than the slit space STS, it is not possible to acquire a pupil plane intensity distribution image in a state in which the measurement spot does not include any pattern (e.g., the slit ST) other than the measurement target. Therefore, the length SY of the measurement spot 50 in the Y direction is set to a smaller value than the slit space STS. More preferably, the length SY of the measurement spot 50 in the Y direction is set to a minimum value.

Next, the spot pitch SP and the number of measurements N are determined (S15). The spot pitch SP and the number of measurements N are set to meet "SP×N>SY+STW" and "SY+(SP×N)<STS+STW+STS". In other words, the spot pitch SP and the number of measurements N are set to meet "2×STS+STW+SY>SP×N>STW+SY". The number of measurements N is a natural number. The number of measurements N is the number of measurements required to acquire a pupil plane intensity distribution image for one evaluation target in a state in which a pattern (e.g., slit ST) other than the measurement target is not in the measurement spot. The number of measurements N is a natural number, with smaller numbers being preferred.

Figure 14:
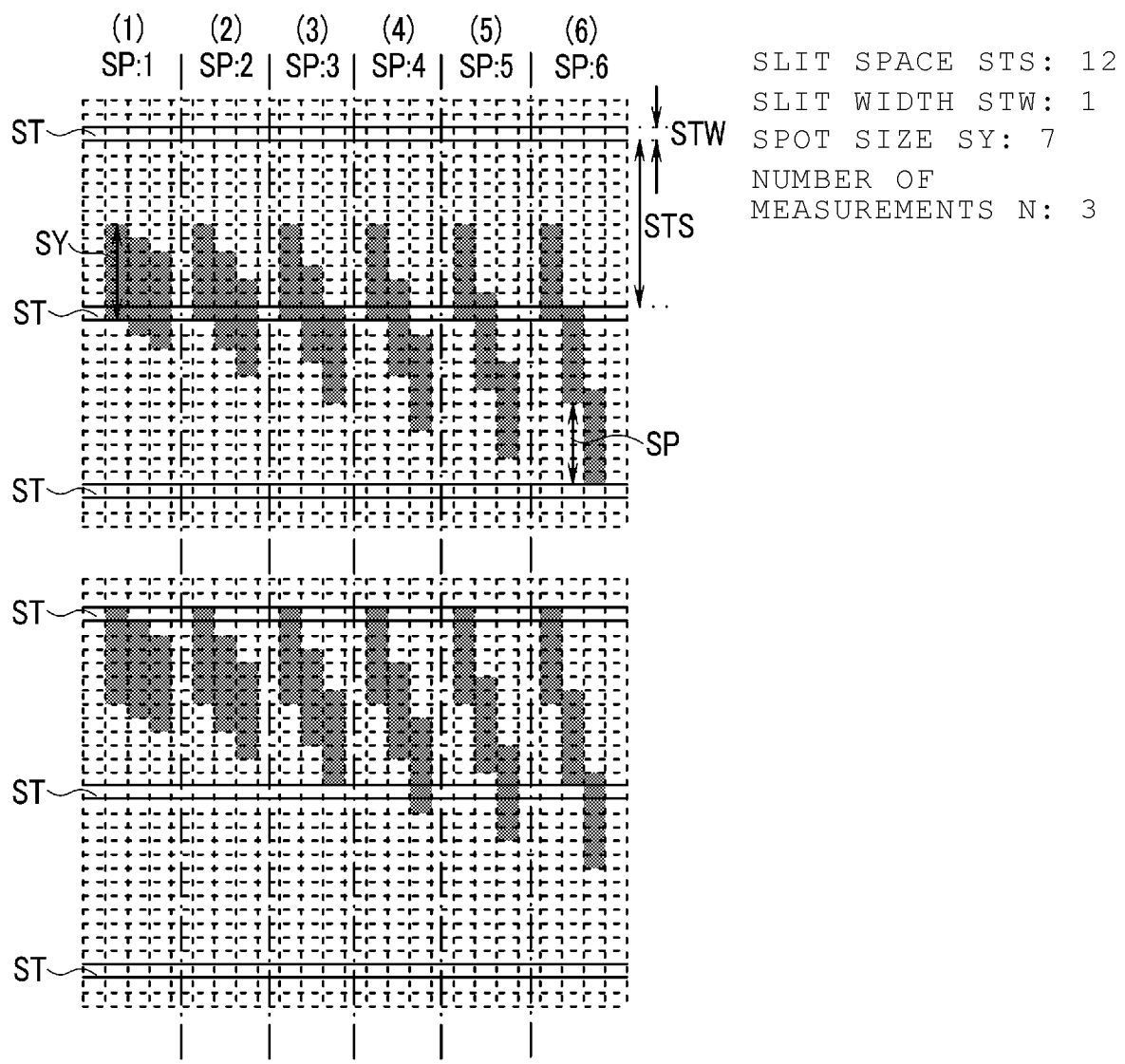
FIG. 14 is a diagram illustrating an example of a spot pitch and the number of measurements.

In the example illustrated in FIG. 14, the slit space STS is 12, the slit width STW is 1, and the spot size SY is 7. Each dimension in FIG. 14 is normalized. In this case, when the number of measurements N is 3, when the spot pitch SP is 1, 2, 3, or 6, the above mathematical formula is not met, but if the spot pitch SP is 4 or 5, the above mathematical formula is met. Therefore, for example, when the spot pitch SP is set to 4 or 5, by performing the measurement three times, it is possible to acquire at least one pupil plane intensity distribution image in a state in which the measurement spot does not include a pattern (e.g., slit ST) other than the measurement target.

Figure 15:
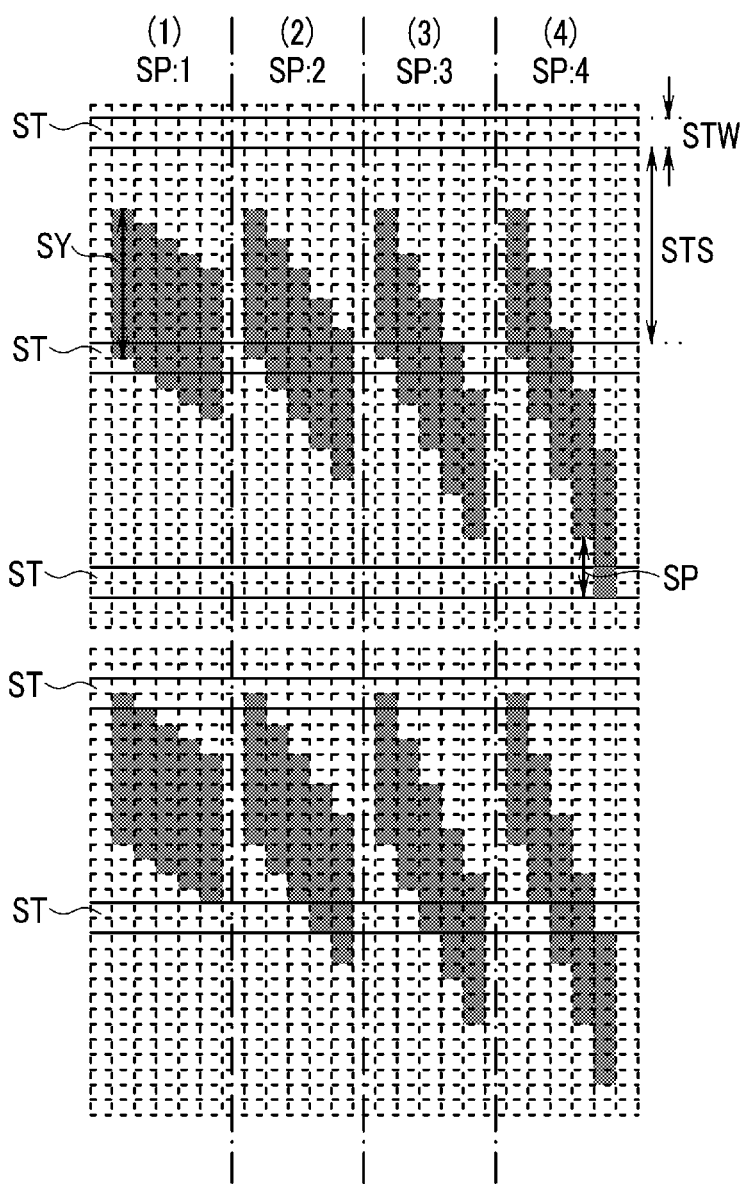
FIG. 15 is a diagram illustrating another example of the spot pitch and the number of measurements.

In the example illustrated in FIG. 15, the slit space STS is 13, the slit width STW is 2, and the spot size SY is 10. Each dimension in FIG. 15 is normalized. In this case, when the number of measurements N is 5, if the spot pitch SP is 1, 2, or 4, the above mathematical formula is not met, but if the spot pitch SP is 3, the above mathematical formula is met. Therefore, for example, when the spot pitch SP is set to 3, by performing measurement five times, it is possible to acquire at least one pupil plane intensity distribution image in a state in which the measurement spot does not include a pattern (e.g., slit ST) other than the measurement target.

When the spot pitch SP and the number of measurements N are set in this way, regardless of where the first setting position of the measurement spot 50 in the Y direction is, when the measurement spots 50 are moved by the number of measurements N at an interval of spot pitch SP, any one of the moved measurement spots is used as the measurement spot 50 while excluding the slit ST. Through the series of procedures described above, the spot pitch SP and the number of measurements N are set, and the settings of various conditions necessary for measurement are completed.

In addition, in the example procedure described above, S12 may be executed after S15. According to the method of the embodiment, in order to measure the overlay of one evaluation target, it is necessary to acquire pupil plane intensity distribution images the number of times set at S15 while moving the measurement spot 50. Therefore, the total measurement time may be longer than when only one pupil plane intensity distribution image is acquired for one evaluation target. For example, by increasing the length SX in the X direction, the measurement spot 50 can be made into an ellipse having a long axis in the X direction, and by enlarging the area of the measurement spot 50, the amount of signals that can be acquired per unit time can be increased. That is, even if the acquisition time of the pupil plane intensity distribution image for one evaluation target is shortened, by increasing the length SX in the X direction and increasing the area of the measurement spot 50, it is possible to prevent a decrease in throughput without decreasing the SN ratio.

Figure 12:
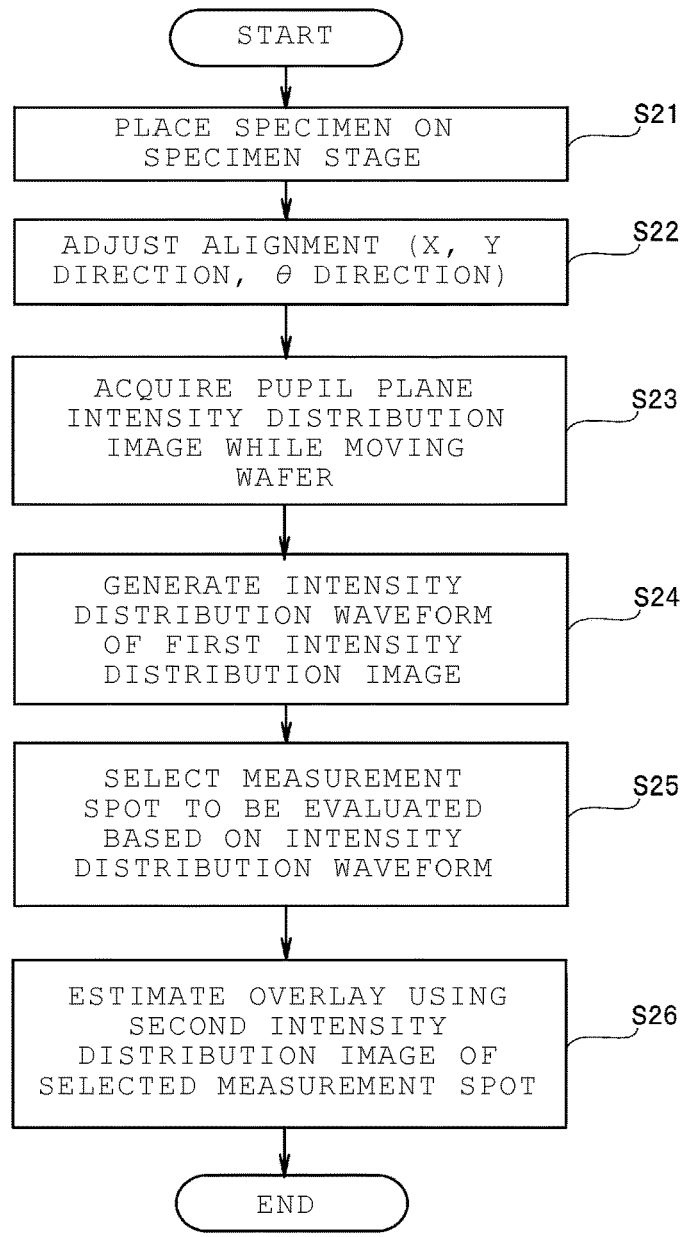
FIG. 12 is a flowchart illustrating an example of a detailed procedure of S2 illustrated in FIG. 10.

Returning to the procedure of FIG. 10, when the various settings at S1 are complete, measurement is performed using the set conditions (S2). S2 is performed according to the procedure illustrated in FIG. 12, for example. FIG. 12 is a flowchart illustrating an example of a detailed procedure of S2 illustrated in FIG. 10. First, the wafer 100, which is the specimen, is placed on the specimen stage 51 (S21), and the alignment is adjusted (S22). The alignment adjustment at S22 includes moving the position of the specimen stage 51 in the X and Y directions such that the first measurement spot 50 is irradiated with illumination light, and rotating the specimen stage 51 around an axis parallel to the Z-axis such that the X direction of the specimen stage 51 and the X direction of the wafer 100 match each other, and the Y direction of the specimen stage 51 and the Y direction of the wafer 100 match each other. Further, the size and shape of the opening provided in the illumination optical system 22 are changed such that the irradiation range of the illumination light matches the size and shape of the measurement spot 50 set at S1. For example, when the block BLK illustrated in FIG. 8 is the evaluation target, alignment adjustment is performed to the position of a measurement spot 50_1 as the first measurement spot.

Figure 13:
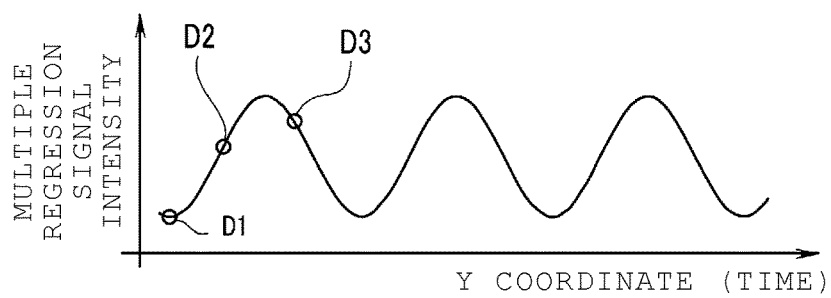
FIG. 13 is a diagram illustrating an example of a change in a multiple regression signal based on a first intensity distribution image.

Then, while moving the wafer 100 in the Y direction, a pupil plane intensity distribution image is acquired for each spot pitch SP set at S1 (S23). At S23, two pupil plane intensity distribution images, that is, the first intensity distribution image and the second intensity distribution image are acquired for one measurement spot 50. For example, in the example illustrated in FIG. 8, the pupil plane intensity distribution images are acquired in the order of the measurement spot 50_1, a measurement spot 50_2, and a measurement spot 50_3. When the acquisition of the pupil plane intensity distribution image is complete, an intensity distribution waveform of the first intensity distribution image is generated (S24). FIG. 13 is a diagram illustrating an example of a change in multiple regression signal intensity based on the first intensity distribution image. Specifically, from the first intensity distribution image acquired at S23, a change in the multiple regression signal intensity with respect to a Y-direction position of the measurement spot is determined using the regression equation that has linearity in the density of the slit ST pattern within the measurement spot. That is, it can be said that the measurement spots for which the multiple regression signal intensity was calculated to be high include the slit ST pattern, and the measurement spots for which the multiple regression signal intensity was calculated to be low do not include the slit ST pattern.

In the graph illustrated in FIG. 13, for example, the multiple regression signal intensity calculated from the first intensity distribution image at the measurement spot 50_1 illustrated in FIG. 8 is plotted on D1, and the multiple regression signal intensity calculated from the first intensity distribution image at the measurement spot 50_2 in the same drawing is plotted on D2, and the multiple regression signal intensity calculated from the first intensity distribution image at the measurement spot 50_3 in the same drawing is plotted on D3.

The measurement spot 50 as the evaluation target is selected based on the intensity distribution waveform obtained in this manner (S25). That is, in the intensity distribution waveform, by selecting the measurement spot 50_1 for which the multiple regression signal intensity is calculated to be low, the measurement spot 50_1 not including the slit ST is extracted from the plurality of measurement spots 50. Finally, the overlay of the memory hole MH and the slit SHE formed in the measurement spot 50_1 is measured based on the asymmetry signal extracted from the second intensity distribution image of the measurement spot selected at S25 (S26). As described above, the overlay measurement is completed.

As illustrated in FIG. 10, the overlay result measured at S2 is fed back to the process (S3). This makes it possible to improve the yield and quality of semiconductor memory devices. For example, when the overlay measurement of the memory hole MH and the slit SHE is performed at the stage of the structure illustrated in FIG. 5 during the manufacturing process of the semiconductor memory device, in the manufacturing process of the upper layer of the same lot, for example, in the lithography process for forming the contact plug 339, the position of the reticle is adjusted in consideration of the misalignment between the memory hole MH and the slit SHE. As a result, the positional shift between the contact plug 339 and the memory hole MH can be reduced. For example, when manufacturing another lot of semiconductor memory devices, the position of the reticle is adjusted in consideration of the already measured misalignment between the memory hole MH and the slit SHE in the lithography process for forming the slit SHE. As a result, the positional shift between the memory hole MH and the slit SHE of the lot can be reduced.

As described above, according to at least one embodiment, the pupil plane intensity distribution image is acquired while moving the position of the measurement spot, and a measurement spot position suitable for accurate overlay measurement is selected using the first intensity distribution image, which is a pupil plane intensity distribution image in which the intensity distribution changes depending on the three-dimensional shape (uneven shape) of the pattern formed on the surface of the wafer 100. Then, at the selected measurement spot, the planar shape of the pattern is estimated using the second intensity distribution image, and the overlay between the target patterns is calculated. As a result, even if a pattern (e.g., slit ST) other than the measurement target that may affect the overlay measurement result is present near the measurement target pattern (e.g., near the memory hole MH and the slit SHE), that influence can be eliminated. That is, it is possible to provide a measuring device and a measuring method capable of measuring overlays robustly and accurately.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:
1. A measuring device comprising:
  a specimen stage for holding a specimen including a surface having a first pattern, a second pattern, and a third pattern;
  a light source configured to irradiate a measurement spot set on the specimen using a multi-wavelength light;

a beam splitter arranged to split reflected light emitted from the measurement spot by the irradiation into two directions;

a first imager configured to acquire a first pupil plane intensity distribution image of one of the reflected lights split by the beam splitter;

a second imager configured to acquire a second pupil plane intensity distribution image of another of the reflected light split by the beam splitter;

an analyzer configured to analyze the second pupil plane intensity distribution image to measure an overlay of the first pattern and the second pattern formed at the measurement spot; and one or more processors configured to:
  acquire the first pupil plane intensity distribution image and the second pupil plane intensity distribution image at each of a plurality of the measurement spots while moving a position of the measurement spot on the specimen,
  select the measurement spot not including the third pattern based on the first pupil plane intensity distribution image, and
  use the overlay obtained by analyzing the second pupil plane intensity distribution image of the selected measurement spot as the overlay of the first pattern and the second pattern.

2. The measuring device according to claim 1, wherein the first pupil plane intensity distribution image is a parallel Nicol image of the reflected light, and the second pupil plane intensity distribution image is a crossed Nicol image of the reflected light.

3. The measuring device according to claim 1, wherein the shape of the measurement spot is one of a circular shape, an elliptical shape, or a rectangular shape.

4. The measuring device according to claim 1, wherein the specimen includes a wafer.

5. The measuring device according to claim 1, wherein the third pattern is a trench pattern.

6. The measuring device according to claim 5, wherein the first pattern is a hole pattern, the second pattern is a trench pattern, and a depth of a trench of the second pattern is shallower than a depth of a trench of the third pattern.

7. A measuring method comprising:
  irradiating a measurement spot set on a specimen including a surface having a first pattern, a second pattern, and a third pattern with a multi-wavelength light;
  splitting reflected light emitted from the measurement spot by the irradiation into two directions;
  acquiring a first pupil plane intensity distribution image of one of the split reflected lights;
  acquiring a second pupil plane intensity distribution image of another of the other split reflected light;
  analyzing the second pupil plane intensity distribution image to measure an overlay of the first pattern and the second pattern formed at the measurement spot; and
  acquiring the first pupil plane intensity distribution image and the second pupil plane intensity distribution image at each of a plurality of the measurement spots while moving a position of the measurement spot on the specimen,
  selecting the measurement spot not including the third pattern based on the first pupil plane intensity distribution image, and
  using the overlay obtained by analyzing the second pupil plane intensity distribution image of the selected measurement spot as the overlay of the first pattern and the second pattern.

8. The measuring method according to claim 7, wherein the overlay is measured based on a symmetry signal.

9. The measuring method according to claim 7, wherein the first pupil plane intensity distribution image is a parallel Nicol image of the reflected light, and the second pupil plane intensity distribution image is a crossed Nicol image of the reflected light.

10. The measuring method according to claim 9, wherein the third pattern is a trench pattern.

11. The measuring method according to claim 10, wherein the first pattern is a hole pattern, the second pattern is a trench pattern, and a depth of a trench of the second pattern is shallower than a depth of a trench of the third pattern.

* * * * *